US006689457B1

(12) United States Patent
Chang et al.

(10) Patent No.: US 6,689,457 B1
(45) Date of Patent: Feb. 10, 2004

(54) ELECTRICALLY CONDUCTIVE COATINGS APPLIED BY INTERNALLY CHARGED ELECTROSTATIC SPRAYERS

(75) Inventors: David C. K. Chang, Bloomfield Hills, MI (US); Monica A. Pickett, Troy, MI (US); Debra Feldman Singer, West Bloomfield, MI (US); Aleksandr Sorser, West Bloomfield, MI (US); Debra Sue Strickland, Rochester, MI (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/959,136

(22) PCT Filed: Apr. 13, 2000

(86) PCT No.: PCT/US00/09879

§ 371 (c)(1), (2), (4) Date: Oct. 17, 2001

(87) PCT Pub. No.: WO00/61302

PCT Pub. Date: Oct. 19, 2000

Related U.S. Application Data

(60) Provisional application No. 60/129,154, filed on Apr. 14, 1999.

(51) Int. Cl.[7] .............................. B05D 1/38; B05D 1/40; C08F 20/00

(52) U.S. Cl. ........................ 428/332; 427/470; 427/477; 525/440; 525/443

(58) Field of Search ................................ 428/332, 323; 427/470, 477; 525/440, 443

(56) References Cited

U.S. PATENT DOCUMENTS

| | | | | | |
|---|---|---|---|---|---|
| 4,035,265 | A | | 7/1977 | Saunders | 252/510 |
| 4,442,269 | A | | 4/1984 | Sommerfeld et al. | 525/440 |
| 5,015,413 | A | | 5/1991 | Nagaoka | 252/511 |
| 5,514,423 | A | * | 5/1996 | Krish et al. | 427/470 |
| 5,837,766 | A | * | 11/1998 | Metro et al. | 524/495 |

FOREIGN PATENT DOCUMENTS

| | | | |
|---|---|---|---|
| CA | 960395 | A | 12/1974 |
| EP | 0209395 | A | 1/1987 |
| EP | 0209286 | | 3/1989 |
| EP | 0328711 | A | 8/1989 |
| EP | 0647688 | A | 4/1995 |
| JP | 58104965 | A | 6/1983 |

OTHER PUBLICATIONS

Alger, Polymer Sci. Dictionary, (Chapman and Hall1997).*

* cited by examiner

*Primary Examiner*—Holly Rickman
(74) *Attorney, Agent, or Firm*—Steven C. Benjamin

(57) ABSTRACT

The present invention provides compositions comprising a graphite, binder precursor and low polarity solvent that upon hardening form layers of an electrically conductive material. The compositions of the present invention are sprayable by an internally charged electrostatic sprayer.

27 Claims, No Drawings

US 6,689,457 B1

ELECTRICALLY CONDUCTIVE COATINGS APPLIED BY INTERNALLY CHARGED ELECTROSTATIC SPRAYERS

This application claims the benefit of Provisional application Ser. No. 60/129,154, filed Apr. 14, 1999.

FIELD OF THE INVENTION

The present invention relates to compositions sprayed by internally charged electrostatic sprayers that harden to form conductive materials, and to articles comprising one or more layers of these conductive materials.

BACKGROUND OF THE INVENTION

Automobiles are painted by various methods and some of them include electrostatic sprayers having high voltage (50 to 140 kilovolt) sprayheads. Automobile bodies used in such processes are usually made of metal and are electrically grounded to create a voltage differential between the spray head and the automobile body. An electrode in the spray head charges droplets of paint, and a charged spray cloud from the spray head is attracted to the grounded automobile body. Paint transfer efficiency (i.e., the amount of paint transferred from a sprayer to a substrate surface) is increased as the paint to be sprayed becomes charged. Internally charged electrostatic sprayers typically have a tube inside the spray head and are able to charge approximately 90% of the paint within the tube. Externally charged electrostatic sprayers typically have external projections surrounding the spray head orifice and charges paint leaving the spray head. Externally charged electrostatic sprayers charge a smaller percentage of paint than do the internally charged sprayers and painting processes using externally charged electrostatic sprayers typically provide lower paint transfer efficiencies than processes using internally charged electrostatic sprayers.

Most automobile bodies also contain plastic parts, such as plastic exterior car body panels and plastic trim components. During electrostatic spray painting, electrostatic charges accumulate on surfaces of uncoated plastic parts and reduce the potential between spray heads and uncoated plastic surfaces. A reduced potential diminishes electrical forces acting on charged paint droplets. Accumulated surface charges may also result in an opposing electrical field on uncoated plastic surfaces repelling air-borne paint particles and resulting in low paint transfer efficiency when plastic surfaces are electrostatically sprayed.

Plastic surfaces coated with conductive primers are thought to reduce accumulation of surface charges during electrostatic spray painting. Coated plastic parts are attached to an automobile body prior to painting and can be grounded just like metal allowing the plastic to "look" like metal when subsequently electrostatically sprayed with topcoat, clearcoat, and/or other automotive finishes. Unfortunately, internally charged electrostatic sprayers are unable to spray compositions, which form conductive coatings with high efficiency because of track back. Track back refers to the ability of electricity to travel along the paint spray and return back to the electrostatic sprayer. Most paint compositions sprayed by an internally charged electrostatic sprayer are not conductive enough to result in track back when being sprayed. However, compositions which form conductive coatings, sprayed with an internally charged electrostatic sprayer, provide a path for electricity to track back and short out the sprayer. Therefore, airsprayers, or externally charged electrostatic sprayer, are usually used to coat plastic parts before automobile manufacture. Then the coated plastic parts are attached to the automobile body and then primed a second time (simultaneously with the application of a primer to metal parts) prior to being painted. Consequently, the surfaces of the plastic parts typically include two layers of primer.

Compositions, which form conductive coatings and are sprayable by an internally charged electrostatic sprayer onto both metal and plastic would be desirable. Both metal and plastic parts could be primed at the same time and the composition would eliminate a manufacturing step of pre-coating plastic parts prior to automobile body assembly. Using an internally charged electrostatic sprayer, to spray such a composition, would increase paint transfer efficiency compared to processes using externally charged electrostatic sprayers.

SUMMARY OF THE INVENTION

The present invention provides compositions comprising graphite, binder precursor, and low polarity solvent The compositions are capable of being sprayed by an electrostatic sprayer that is internally charged and that upon hardening forms a layer of electrically conductive material. Both metal and plastic parts of an automobile body may be electrostatically sprayed with compositions of the present invention so that plastic parts are primed only once during manufacturing reducing the costs of separately applying a layer of conductive material to a plastic part prior to automotive assembly. The compositions of the present invention may also be used as primers for metal parts that are applied prior to the electrostatic spraying of topcoat. Consequently, the conductive compositions of the present invention provide, in part, at least two functions: a primer for metal and a conductive surface to plastic. The conductive compositions of the present invention are capable of being sprayed through the spray head of an internally charged electrostatic sprayer without track back and shorting out the spray equipment (firefault limit is typically set at 180 microamp). The spray head of an internally charged electrostatic sprayer used to spray compositions of the present invention may have a voltage in the range of about 50 to about 140 kilovolts, preferably about 80 to about 90 kilovolts. By electrostatically spraying compositions a step is removed from an automobile manufacturing process. Automobile manufacturers may therefore obtain a cost savings. In addition the coatings of the present invention are chip resistant, impact resistant, have a good appearance and have good adhesion to metal and plastic.

The present invention also provides an article comprising a substrate attached to a layer of electrically conductive material. The compositions of the present invention harden to form a coating (a layer of electrically conductive material) on the surface of a substrate.

The present invention also provides a process of coating comprising the steps of spraying with an internally charged electrostatic sprayer a composition comprising graphite, binder precursor, and a low polarity solvent As used herein, with respect to the present invention, the following shall apply:

"capable of being sprayed electrostatically" refers to compositions sprayed by an internally charged electrostatic sprayer without resulting in track back.

"composition" refers to the flowable state of a coating comprising binder precursor, graphite and a low polarity solvent.

"coating" refers to a hardened composition described above.

"pigment" refers to carbon black, graphite, $TiO_2$ or other particles that provide color to a composition.

DETAILED DESCRIPTION OF THE INVENTION

Compositions of the present invention contain a binder precursor including one or more resins that harden to form a binder. A binder precursor may include a hydroxy containing resin, such as polyester, acrylic modified alkyl, acrylic polyols, epoxy, isocyanate, acrylate, methacrylate or combinations thereof. Polyester resins are the preferred binder precursor and include polyester urethane, polyester epoxy, or combinations thereof. Preferably, a polyester used in the present invention has a hydroxyl number of about 100 to about 250, a number average molecular weight of about 500 to about 9000, and an acid number of 1 to about 40. A binder precursor of the present invention preferably comprises about 45 to 85 weight percent of a hydroxyl containing resin.

A binder precursor of the present invention also includes one or more cross-linking resins, preferably melamine resin. A melamine resin suitable for use in the practice of the present invention includes a non-alkylated melamine resin, a partially alkylated melamine resin, a completely alkylated melamine resin, a melamine formaldehyde resin or combinations thereof. Suitable partially alkylated melamine resin and/or fully alkylated melamine resin used in the practice of the present invention includes CYMEL 1133, RESIMENE 755, CYMEL 1168, RESIMENE 735, CYMEL 327, RESIMENE BM-5503 or combinations thereof. The melamines commercially known as CYMEL are sold by Cytex, West Patterson, N.J. The melamines commercially known as RESIMENE are sold by Solutia, Springfield, Mass. Other cross-linking resins suitable for the practice of the present invention include isocyanates such as blocked and/or unblocked isocyanates such as DESMODUR BL-3175 sold by Bayer, Toronto, Ontario. A binder precursor preferably includes about 15 weight percent to about 55 weight percent of cross-linking resin.

Compositions of the present invention include one or more low polarity solvents. Allow polarity solvent, as used herein, is defined as a solvent having a polarity in the range of 1 to 4.5 Hansen (H-bonding polarity), preferably in the range of 1 to 3.0 Hansen (H-bonding polarity). Preferred solvents include esters and aromatic hydrocarbon solvents. Aromatic hydrocarbons used in the practice of the present invention include compounds having a six carbon ring structure such as toluene, ethyl-benzene or xylene. Preferred aromatic hydrocarbons include those having a boiling point in the range of about 150° C. to about 180° C. such as AROMATIC 100, SOLVESSO 100 sold by Exxon, Baytown, Tex. and SHELLSOL A sold by Shell Company, Houston, Tex. The most preferred aromatic hydrocarbons include those having boiling points in the range of approximately 180° C. to 220° C. such as AROMATIC 150 sold by the Exxon Company, Baytown, Tex., SOLVESSO 100 sold by the Exxon Company, Baytown, Tex., SHELLSOL AB sold by Shell Company, Houston, Tex. Other suitable aromatic hydrocarbons used in the practice of the present invention include those having boiling points in the range of about 215° C. to about 295° C. such as AROMATIC 200 sold by the Exxon Company, Baytown, Tex. PANSOL AN-8N sold by Amoco Company, Altanta, Ga. may also be use in the practice of the present invention. Esters suitable for the practice of the present invention include n-butyl propionate, n-butyl acetate, iso-butyl acetate, primary amyl acetate, 2-ethyl hexyl acetate or combinations thereof Solvent concentration will depend on desired composition viscosity and the components used to make the composition, Graphites suitable for use in the practice of the present invention may be either natural or synthetic, preferably synthetic. Examples of such graphites include M440, M450, M490, M850 and M890 (sold by Asbury Graphite Mills, Inc., Asbury, N.J.). Graphites may have a mean particle size of about 1 micron to about 15 micron, preferably in the range of about 3 micron to about 9 micron. Graphites having mean particle size of 5 micron is most preferred. Electrostatically sprayable compositions of the present invention include graphite to binder ratio of about 10/100 to 40/100, preferably between about 20/100 to about 30/100. Not to be held to any particular theory, it is thought that the combination of low polarity solvent in combination with the described pigment binder ratios are responsible for inhibiting track back during composition spraying and for making a conductive coating.

Carbon black is preferably added to a composition of the present invention. Examples of carbon black suitable for the practice of the present invention include conductive grades such as CONDUCTEX 975 ULTRA (sold by Columbian Chemical Company, Atlanta, Ga.), Printex XE-2 (sold by Degussa, Frankfurt, Republic of Germany), BLACK PEARLS 2000 (sold by Cabot Corporation, Boston, Mass.). Compositions of the present invention include a carbon to binder ratio of about 0/100 to 4/100. Electrostatic sprayable compositions preferably have a carbon black to binder ratio in the range of about 0/100 to 2.0/100, most preferably 0/100 to 1/100.

Dispersants may be added to compositions of the present invention, in part, for purposes of dispersing graphite, carbon black and/or other pigments. Suitable dispersants used in the practice of the present invention include titanate esters such as TYZOR TE (sold by the Du Pont Company, Wilmington, Del.), polymer dispersants such as AB polymer dispersants as described in U.S. Pat. No. 4,656,226, or DISPERBYK 161, 162, 170 (sold by Byk-Chemie, Wallingford, Conn.), comb dispersants such as SOLSPERSE 24000 (Zeneca, Wilmington, Del.), or combinations thereof.

Additives optionally added to compositions of the present invention include surface tension modifiers, rheology control agents, antipopping additives polyacryate, aryl acrylate, modified polysiloxanes or combinations thereof. Conductive coatings of the present invention are preferably gray in color and the blackness of a coating may be altered by the addition of $TiO_2$. Adding $TiO_2$ to conductive coatings lightens coating color. Adding colored organic or inorganic pigments to the conductive coating may form different coating colors. Extender pigments such as barium sulfate and/or talc may also be added to the compositions of the present invention.

Compositions of the present invention preferably include a catalyst, preferably an acid catalyst. Acid catalyst that may be used in the practice of the present invention include, in part, para-toluene sulfonic acid (NACURE 2500), phenyl acid phosphate (NACURE 4575), dodecylbenzene sulfonic acid (NACURE XP-221, dinonylnaphthalene disulfonic acid, or combinations thereof. The NACURES are sold by King Industries, Norwalk, Conn.

Method of Making Coatings

Pigment dispersions are used to make coatings of the present invention. Graphite may be combined with binder precursor, solvent and optional additives such as a dispersant, then dispersed by sand grinding, ball milling, attritor grinding, or by other devices known by one skilled in the art. Alternatively, graphite may be dispersed directly into the paint formula Carbon black is combined with binder precursor, solvent, and optional additives such as a dispersant and dispersed by conventional methods such as ball milling, attritor grinding, or media milling. Pigment dispersions are then mixed with remaining composition ingredients, such as resins, solvents, and additives, to form the final composition.

The compositions of the present invention may be applied to a substrate by spraying, brushing, dipping, or other application techniques known by one skilled in the art. It is preferred that the conductive primers of the present invention are applied to a substrate by an internally charged electrostatic sprayer that has a spray head having a voltage of about 50 to about 140 kilovolts, or about 50 to about 150 kilovolts, preferably 80 to about 90 kilovolts. An example of an electrostatic sprayer suitable for the practice of the present invention includes SAMES 605 BELL sold by Binks-Sames, Livonia, Mich.

Upon being applied to a substrate, compositions of the present invention are hardened by an external energy source, preferably heat Coated substrates may be heated to about 230° F. to 350° F., preferably from about 235° F. to 245° F. until the composition is substantially hardened. The bake time may last from 15 minutes to 60 minutes, and more preferably from 25 minutes to 45 minutes. Baking temperatures and durations are dependent upon the components of a composition and will vary from composition to composition. Other external energy sources used to harden the compositions may include ultraviolet light, electron beam, infared radiation, or combinations thereof.

Compositions of the present invention are applied to substrates, including in part, metal such as aluminum, steel, coated metals (cathodic electrocoat), or combinations thereof to form an article. Alternatively, the substrate may be plastic such as polycarbonate, nylon, polybutylene terephthalate, polyesters, or combinations thereof The substrates may also be combinations of both plastics and metals. Preferably, the substrate is an automotive plastic such as nylon/amorphous polyphenylene oxide alloy commercially available as NORYL GTX (sold by General Electric, Jamaica, N.Y.); polycarbonate/polybutylene terephthalate commercially available as XENOY (sold by General Electric, Jamaica, N.Y.); Polycarbonate/ABS (sold by Dow Chemical Company, Freeport, Tex.); or amorphous nylon commercially available as BEXLOY (sold by Du Pont, Wilmington, Del.). These automotive plastics are used to make automotive fenders, body panels, bumpers, interior parts, spoilers, bumpers and other parts.

Upon hardening, the compositions of the present invention preferably form a layer of conductive material having conductivity in the range of about 100 Randsburg to about 115 Randsburg, preferably greater than 120 Ransburg up to about 140 Ransburg. The layer of conductive material may have a thickness of about 15 micron to about 50 micron, preferably from about 20 micron to about 35 micron. Coatings of the present invention (conductive materials) may be used in various applications that require a conductive surface, such as to enhance the transfer efficiency of a subsequent coating, such as paint, to a substrate surface (such as plastics). Preferably, the coatings are used as conductive primers and enhance paint transfer efficiency to the exterior of automobile parts during electrostatic spraying. The automobile parts may be metal, plastic, or combinations thereof.

EXAMPLES

The examples below are carried out using standard techniques, which are well known and routine to those skilled in the art, except where otherwise described in detail. The examples are illustrative, but do not limit the invention. Coatings of the present invention were preferentially formed by making pigment dispersions and combining those dispersions with other components. All percentages are part by weight unless indicated otherwise.

| DEFINITIONS | |
|---|---|
| DUPONT R-706 | TiO2, commercially available from Du Pont, Wilmington, DE |
| SOLVESSO 150 | Aromatic hydrocarbon |
| TYZOR TE | Triethanolamine titanate ester available from Du Pont, Wilmington, DE |
| CYMEL 1133 | Melamine, partially alkyld, commercially available from Cytec, city, state |
| CYMEL 1168 | Melamine, commercially available from Cytec, city, state |
| RESIMENE 755 | Melamine, commercially available from Solutia, St. Louis, MO |
| RESIMENE 735 | Melamine, commercially available from Solutia, St. Louis, MO |
| CYMEL 327 | Melamine, commercially available from Cytex, West Patterson, NJ |
| RESIMENE-5503 | Melamine, commercially available from Cytex, West Patterson, NJ |
| DISCON L-1984 | Acrylic surfactant, commercially available from King Industries, Norwalk, CT |
| NACURE XP-221 | Acid Catalyst, commercially available from Chem Central, Philadelphia, PA |
| AMP-95 | Chem Central, Philadelphia, PA |

Polyester Resin 1

628.25 gm (gram) caprolactone and 264.55 gm 1,4-cyclohexanedimethanol were combined in a reactor vessel followed by the addition of 0.122 gm dibutyl tin dilaurate and 1.078 gm xylene. The reactor vessel was heated to 25° C. and the temperature was allowed to reach 140° C. The contents of the reactor vessel were incubated for 4 hours at 140° C. and then cooled to 80°C.

Polyester Resin 2

21.23 gm deionized water and 191.06 gm neopentyl glycol were combined in a reactor vessel with an inert gas purge. The contents of the reactor vessel were heated to approximately 65° C. and the following ingredients were added to the reactor vessel: 25.95 gm trimethylol propane, 145.42 gm azelaic acid, and 177.91 gm dodecanedioic acid. 11.36 gm toluene was charged to a water separator. The contents of the reactor vessel were then covered with inert gas and heated to 120°C. Water was removed from the reactor vessel by heating the vessel at temperatures of about 120° C. to about 240° C. The vessel was heated at 240° C. until the contents of the reactor vessel had an acid number of about 0 to 1.5 and a Gardener viscosity of Z2-Z4. The contents of the vessel were cooled to 120° C. by the addition of 19.05 gm toluene and 88.6 gm AROMATIC 100. Next 39.40 gm neopentyl glycol and 0.085 gm stannous octoate (FASCAT 2003 catalyst obtained from ELF Ato Chem, N.A., Inc., Philadelphia, Pa.) was added to the vessel followed by the addition of 106.95 gm trimethyl hexamethylene diisocyanate (Creanova, Inc., Somerset, N.J.) over a 30 minute period. The contents of the reactor vessel was heated held at 120–145° C. for 30 minutes followed by the addition 94.57 gm AROMATIC 100. The contents of the reactor vessel were covered with an inert gas and then cooled to 70° C., followed by filtering.

Pigment Dispersion 1

Dispersion 1 was prepared by combining 26.72 weight percent of a polyester resin commercially available as MCWHORTER 57-5789 (sold by McWhorter Technologies, Carpentersville, Ill.), 48.29 weight percent AROMATIC 150 and 24.99 weight percent conductive graphite. The dispersion was mixed for 3 hours using high-speed dispersing (HSD) equipment, such as HOCKMEYER high blade (style G), sold by Hockmeyer Equipment Corp., Harrison, N.J.

Pigment Dispersion 2

Pigment Dispersion 2 was prepared by combining and mixing 26.57 weight percent of a polyester Resin (MCWHORTER 57-5789), 29.98 weight percent n-butyl propionate, 29.98 weight percent AROMATIC 150, 9.18 gm AB block copolymer (glycidyl methacrylate/butyl methacrylate/methyl methacrylate described in U.S. Pat. No. 4,656,226), and 4.3 weight percent of carbon black. The mixture was processed through a 2-liter Netsch LMZ media mill containing 0.6–5 0.8 mm zirconia media. Tip speed=14 m/sec at flow-rate=14 sec/half-pint for 1 hour in a one tank recirculation process.

Pigment Dispersion 3

Pigment Dispersion 3 was prepared by combining 14 weight percent of a polyester resin (80% solids, trimethylol propane/neopentyl glycol/1.6 hexanediol/isophthalic/orthophthalic anhydride/adipic acid/dodecanedioic acid; molecular weight 6,000–10,000, hydroxyl number 130–155 and acid number 2–10 as described in U.S. Pat. No. 4,442,269), 9 weight percent AROMATIC 150, 9 weight percent butyl, cellosolve and 68 weight percent TiO2 (DuPont R-706). The is dispersion was mixed for 60 minutes using HSD equipment and then pass through a 8 gallon sandmill (0.8–1.0 mm zirconia media) at 8 pounds/hour.

Composition 1

Composition 1 is an example of a coating that when hardened is conductive but is not capable of being sprayed with an internally charged electrostatic sprayer. Composition 1 was prepared by combining 5.9 weight percent of MCWHORTER polyester resin, 7.7 weight percent Polyester Resin 2, 5.9 weight percent of Polyester resin 3. The following ingredients were combined with the resin mixture: 10.0 weight percent RESIMENE 735 and 2.0 weight percent CYMEL 1168; 3.8 weight percent n-butanol; 3.0 weight percent 2-ethyl hexanol and 0.6 weight percent acrylic surfactant (10 weight percent DISLON L-1984 solution in AROMATIC 100). The reaction mixture was allowed to mix for about 30 minutes. Then 1.2 weight percent of a blocked acid catalyst (a solution of 48.3 weight percent NACURE XP-221 sulfonic acid and 10.8 weight percent AMP-95) was slowly added to the reaction mixture while stirring and the reaction mixture was mixed for an additional 30 minutes. While stirring, the reaction mixture was combined with 23 weight percent Pigment Dispersion 3, 22.7 weight percent Pigment Dispersion 2 and 14.0 weight percent Pigment Dispersion 1. The reaction mixture was mixed for an additional 30 minutes.

Composition 2

Composition 2 is an example of a composition that can be sprayed by an internally charged electrostatic sprayer. Composition 2 was prepared by combining 4.3 weight percent MCWHORTER polyester resin, 7.2 weight percent Polyester Resin 2, and 5.5 weight percent of Polyester Resin 3. The following ingredients were combined with the resin mixture: 9.4 weight percent RESIMENE 735, 1.8 weight percent CYMEL 1168, 3.8 weight percent of alcohol n-butanol, 3.0 weight percent 2-ethyl hexanol, and 0.6 weight percent of acrylic surfactant (10 weight percent DISLON L-1984 solution in AROMATIC 100). The reaction mixture was allowed to mix for about 30 minutes. 1.1 weight percent of an acid catalyst (a solution of 48.3% NACURE XP-221 sulfonic acid and 10.8% AMP-95 in isobutyl alcohol) was slowly added to the reaction mixture while stirring and the reaction mixture was mixed for an additional 30 minutes. While stirring, the reaction mixture was combined with 21.5 weight percent Pigment Dispersion 3, 5.1 weight percent Pigment Dispersion 2 and 36.6 weight percent Pigment Dispersion 1. The reaction mixture was mixed for an additional 30 minutes.

Test Procedures

The following test procedures were performed on coatings prepared form Compositions 1 and 2. Compositions 1 and 2 were sprayed to a film thickness of about 25 microns on to a plastic substrate and baked for 25 minutes at a substrate temperature of 115.56° C. The coatings are numbered to correspond to the composition as illustrated in Table 1. The dry conductivity of the coatings was measured using the Ransburg Sprayability Meter (Model 8333-00) sold by Ransburg Corporation, Indianapolis, Ind. Wet Resitivity was measured using the Sames AF200 Resistivoltmeter (sold by Binks-Sames, Livonia, Mich.). The measurements were taken using the equipment operating instructions from the supplier.

TABLE 1

| Performance* | Test Method | Coating 1 | Coating 2 |
|---|---|---|---|
| Dry Conductivity | Raysburg Sprayability | 140 | 125 |
| Wet Resistivity | Same AP200 Resistability | <5 $\mu$ohm/cm$^2$ | 16 $\mu$ohm/cm$^2$ |
| Adhesion | ASTM D-3359-93 | 100% pass | 100% pass |
| Humidity Adhesion | | 100% pass | 100% pass |

The above tests demonstrate both coatings perform well having good adhesion and conductivity. Coating 2 had a higher wet resistivity than Coating 1 indicating Coating 2 has a lower conductivity in the wet state.

Electrostatic Sprayability Test

The electrostatic spray test was performed by spraying Compositions 1 and 2 with a Sames 605 Bell internally charged electrostatic sprayer (sold by Binks-Sames, Livonia, Mich.). The electrostatic sprayer was set at 80 kV (180 microamp) and sprayed for a duration described in Table 2.

TABLE 2

| Composition | Result |
|---|---|
| Composition 1 | Back Track occurred immediately after the sprayer was turned on. The sprayer shorted out. |
| Composition 2 | Back Track did not occur after 30 min nor at 99% Relative humidity and at 35° C. |

Transfer Efficiency Test

Paint was sprayed as described above and the build up of a layer of conductive material on a metal surface was measured using a Fischer Scope (sold by Fischer Company). The method used for quantifying the conductive material on the surface of the metal substrate was described in equipment operating instructions from the supplier and are well known in the art Transfer efficiency was determined by comparing the amount sprayed to the amount of conductive materials on the surface of the metal substrate.

TABLE 3

| Voltage | Composition 1 | Composition 2 |
|---------|---------------|---------------|
| 40 kV   | 15–20%        |               |
| 80 kV   | Not sprayable | 60+%          |

Transfer Efficiency Test demonstrated Composition 2, a sample composition of the present invention, can achieve a higher paint transfer efficiency than Composition 1 because it can be sprayed at higher voltages. A painting process using an internally charged electrostatic sprayer and Composition 2 had a paint transfer efficiency that was at least 2 fold greater than the same process using Composition 1.

What is claimed is:

1. A conductive primer composition comprising graphite, conductive carbon black, binder precursor and low polarity solvent, wherein the composition contains graphite in a graphite to binder weight ratio of about 10/100 to about 40/100 and the carbon black in a carbon black to binder weight ratio of 0/100 to about 4/100, and is capable of being sprayed by an internally charge electrostatic sprayer and of hardening to form a layer of an electrically conductive material having a conductivity in the range of about 100 up to about 140 Ransburg units.

2. The composition of claim 1, wherein the internally charged electrostatic sprayer sprays the composition at a voltage of about 50 to about 150 kilovolts.

3. The composition of claim 1, wherein the internally charged electrostatic sprayer sprays the composition at a voltage of about 80 to about 90 kilovolts.

4. The composition of claim 1, wherein the binder precursor comprises a hydroxyl containing resin and a crosslinking resin.

5. The composition of claim 1, wherein the hydroxyl containing resin is selected from the group consisting of polyester, epoxy, acrylate, methacrylate, isocyanate, acrylic polyol and combinations thereof.

6. The composition of claim 4, wherein the crosslinking resin is melamine.

7. The composition of claim 1, wherein the low polarity solvent is selected from the group consisting of toluene, ethyl, benzene, xylene, n-butyl propionate, n-butyl acetate, iso-butyl acetate, primary amyl acetate, 2-ethyl hexyl acetate and combinations thereof.

8. The composition of claim 1, wherein the graphite has a mean particle size in the range of about 3 micron to about 12 micron.

9. The composition of claim 1, wherein the binder precursor comprises about 45 weight percent to about 85 weight percent of a hydroxyl, containing resin.

10. The composition of claim 4, wherein the binder precursor comprises about 15 weight percent to about 55 weight percent of a cross-linking resin.

11. The composition of claim 1 comprising titanium dioxide.

12. The composition of claim 1 comprising carbon black.

13. The composition of claim 12 wherein the composition comprises carbon black in a carbon black to binder weight ratio of up to about 2.0/100.

14. The composition of claim 1 comprising a dispersant.

15. The composition of claim 14 wherein the dispersant is selected from the group consisting of titanate ester, polymer dispersant and combinations thereof.

16. An article comprising a substrate attached to a layer of electrically conductive material, the electrically conductive material comprising a hardened composition of claim 1.

17. The article of claim 16 wherein the layer of electrically conductive material has a thickness in the range of about 15 micron to about 50 micron.

18. The article of claim 16 wherein the substrate is plastic, metal or combinations thereof.

19. The article of claim 16 wherein the layer of electrically conductive material comprises titanium dioxide.

20. The article of claim 16 wherein the layer of electrically conductive material comprises carbon black.

21. A process of coating comprising the steps of:

spraying with an internally charged electrostatic sprayer a composition of claim 1.

22. The process of claim 21 wherein the internally charged electrostatic sprayer sprays the composition at about 80 to about 90 kilovolts.

23. The process of claim 21 wherein the internally charged electrostatic sprayer sprays the composition at about 50 to about 140 kilovolts.

24. The process of claim 21 comprising the step of spraying the composition onto a substrate surface.

25. The process of claim 24 wherein the substrate is the exterior of an automobile.

26. The process of claim 24 comprising the step of hardening the coating to form a layer of electrically conductive material.

27. A composition comprising graphite, optionally conductive carbon black, polyester resin, melamine resin and low polarity solvent, capable of being sprayed by an internally charge electrostatic sprayer and of hardening to form a layer of an electrically conductive material.

* * * * *